(12) United States Patent
Chou

(10) Patent No.: US 7,747,273 B2
(45) Date of Patent: Jun. 29, 2010

(54) ASYNCHRONOUS POWER MANAGEMENT METHODS AND SYSTEMS FOR WIRELESS NETWORKS

(75) Inventor: Zi-Tsan Chou, Taipei (TW)

(73) Assignee: Institute for Information Industry, Taipei (TW)

( * ) Notice: Subject to any disclaimer, the term of this patent is extended or adjusted under 35 U.S.C. 154(b) by 799 days.

(21) Appl. No.: 11/640,402

(22) Filed: Dec. 18, 2006

(65) Prior Publication Data

US 2007/0281658 A1 Dec. 6, 2007

(30) Foreign Application Priority Data

Jun. 5, 2006 (TW) ............................... 95119843 A

(51) Int. Cl.
*H04M 1/00* (2006.01)
(52) U.S. Cl. ...................... 455/522; 455/574; 455/41.2; 370/318
(58) Field of Classification Search ................. 370/311, 370/390, 389, 338, 468; 455/574, 69, 522
See application file for complete search history.

(56) References Cited

U.S. PATENT DOCUMENTS 6,108,316 A * 8/2000 Agrawal et al. ............. 370/311

| | | | | |
|---|---|---|---|---|
| 2003/0081603 A1* | 5/2003 | Rune | ........................... | 370/390 |
| 2004/0105401 A1* | 6/2004 | Lee | .............................. | 370/311 |
| 2005/0233704 A1* | 10/2005 | Maekawa | ..................... | 455/69 |
| 2006/0193315 A1* | 8/2006 | Sinivaara et al. | ............ | 370/389 |
| 2006/0215622 A1* | 9/2006 | Abdel-Kader et al. | ........ | 370/338 |
| 2007/0147423 A1* | 6/2007 | Wentink | ..................... | 370/468 |

* cited by examiner

*Primary Examiner*—Edward Urban
*Assistant Examiner*—Golam Sorowar
(74) *Attorney, Agent, or Firm*—Birch, Stewart, Kolasch & Birch, LLP

(57) ABSTRACT

Asynchronous power management methods and systems for a first station and a second station in a wireless network. The second station dynamically tunes a SRI (Schedule Repetition Interval) value according to residual power status, quality-of-service requirements, or other considerations. The SRI value is an odd prime number. Once the SRI is determined, the second station sets the number and positions of ABIs (Awake Beacon Intervals)" within an SRI. An ABI-set defined as the positions of ABIs in an SRI forms a cyclic difference set comprising at least two consecutive BIs. The second station transmits a beacon frame within a beacon window. When the first station has recently received the beacon frame from the second station, the first station predicts the awake/sleep schedule of the second station, and transmits data frames to the second station at the ABI of the second station.

24 Claims, 13 Drawing Sheets

1000

| SRI | Cyclic Difference Set (A). The positions of ABIs in SRI is m+A, m is an arbitrary integer. | | | | | | | | | |
|---|---|---|---|---|---|---|---|---|---|---|
| 3 | 0 | 1 | | | | | | | | |
| 5 | 0 | 1 | 2 | | | | | | | |
| 7 | 0 | 1 | 3 | | | | | | | |
| 11 | 0 | 1 | 2 | 5 | | | | | | |
| 13 | 0 | 1 | 3 | 9 | | | | | | |
| 17 | 0 | 1 | 2 | 4 | 12 | | | | | |
| 19 | 0 | 1 | 2 | 6 | 9 | | | | | |
| 23 | 0 | 1 | 2 | 3 | 7 | 11 | | | | |
| 29 | 0 | 1 | 2 | 3 | 4 | 9 | 14 | | | |
| 31 | 0 | 1 | 3 | 8 | 12 | 18 | | | | |
| 37 | 0 | 1 | 2 | 4 | 10 | 15 | 22 | | | |
| 41 | 0 | 1 | 2 | 3 | 4 | 9 | 15 | 25 | | |
| 43 | 0 | 1 | 2 | 3 | 4 | 10 | 15 | 26 | | |
| 47 | 0 | 1 | 2 | 3 | 5 | 16 | 22 | 40 | | |
| 53 | 0 | 1 | 2 | 3 | 4 | 7 | 21 | 29 | 44 | |
| 59 | 0 | 1 | 2 | 3 | 6 | 13 | 21 | 35 | 44 | |
| 61 | 0 | 1 | 2 | 3 | 7 | 15 | 25 | 36 | 45 | |
| 67 | 0 | 1 | 2 | 3 | 4 | 5 | 12 | 20 | 26 | 39 |
| 71 | 0 | 1 | 2 | 3 | 4 | 10 | 18 | 23 | 34 | 46 |
| 73 | 0 | 1 | 3 | 7 | 15 | 31 | 36 | 54 | 63 | |
| 79 | 0 | 1 | 2 | 6 | 13 | 28 | 31 | 47 | 48 | 71 |
| 83 | 0 | 1 | 2 | 3 | 4 | 5 | 12 | 21 | 27 | 40 | 54 |
| 89 | 0 | 1 | 2 | 3 | 5 | 12 | 18 | 43 | 57 | 65 | 71 |
| 97 | 0 | 1 | 2 | 3 | 4 | 5 | 9 | 17 | 33 | 43 | 54 | 79 |

FIG. 10

ASYNCHRONOUS POWER MANAGEMENT METHODS AND SYSTEMS FOR WIRELESS NETWORKS

BACKGROUND OF THE INVENTION

1. Field of the Invention

The disclosure generally relates to power management methods and systems for medium access control over wireless networks, such as ad-hoc wireless networks, where each power-saving station can dynamically tune its duty cycle and timing synchronization among power-saving stations is not necessary.

2. Description of the Related Art

IEEE 802.11 is currently the most popular international MAC (Medium Access Control) standard for WLANs (Wireless Local Area Networks). Based on the network architecture, the WLANs can be classified into "infrastructure WLANs" and "ad hoc wireless networks." FIG. 1 is a schematic diagram illustrating an ad hoc network, where each station (110, 120, 130, 140 and 150) can communicate with adjacent stations via radio.

FIG. 2 is a schematic diagram illustrating a power consumption model for a general wireless network interface card installed in a station. Each station can be in exact one of transmitting, receiving, listening, or doze states. From FIG. 2, we can see that if a station wants to save energy, it should enter the doze state. In the doze state, a station cannot send and receive, but consumes very low power.

In IEEE 802.11 power management for ad hoc networks, time is divided into fixed-sized beacon intervals (BIs for short). Mobile station operating in the power-saving (PS for short) mode should wake up prior to each TBTT (target beacon transmission time) and wait for a random backoff time to contend for broadcasting a beacon frame, which is mainly used for timing synchronization. All power-saving (PS for short) station should remain awake during the entire ATIM (Announcement Traffic Indication Message) window. If a station does not send or receive ATIM frames during the ATIM window, then that station may enter the doze state after the end of the ATIM window. If a station receives a directed ATIM frame during the ATIM window, then that station should reply the ATIM ACK (Acknowledgement) and remains awake during the entire beacon interval (BI for short). After the end of the ATIM window, the source station uses the DCF (Distributed Coordination Function) procedure to send buffered data frames to intended destination, and that destination should acknowledge it receipt. For a more detailed presentation, please refer to the IEEE 802.11 specification.

FIG. 3 is a schematic diagram illustrating an example of power management in an ad hoc network based on IEEE 802.11. As shown in FIG. 3, stations X and Y compete to broadcast a beacon frame for timing synchronization when BI 1 begins. Once station Y successfully broadcasts the beacon frame, other stations (including Y) cancel their beacon transmissions. On the other hand, since both stations X and Y do not send and receive any ATIM frames during the ATIM window (AW for short), they enter the doze state after the AW ends. During the AW of BI 2, station Y sends the ATIM frame (denoted "A" in FIG. 3) to station X and X replies an ATIM ACK (denoted "a" in FIG. 3). After the AW ends, both stations X and Y remain awake. In addition, station Y transmits a data frame (denoted "D" in FIG. 3) to station X, and X immediately replies a data ACK (denoted "d" in FIG. 3) to Y.

However, the mechanism for timing synchronization in IEEE 802.11 is not perfect. For example, simulation results show that if the number of stations in an ad hoc wireless network is 200, the average clock offset among the stations is about 220 us, and the maximum clock offset may approach about 500 us. If the number of stations in an ad hoc wireless network is 500, the average clock offset among the stations is about 264 us, and the maximum clock offset may approach about 600 us. Once the clock offset among stations in the network is large enough, the IEEE 802.11 power management mechanism may completely fails. For example, in FIG. 4, we can see that, when the clock offset ($\Delta T$) between stations X and Y lies in between AW and BI-AW, PS stations X and Y forever lose each other's beacon and ATIM frames. (Note that "PS" stands for "power-saving".) This also implies that stations X and Y can never send data frames to each other when they are operating in the PS mode.

Conventional asynchronous power management protocols require that all PS stations must have the same SRI (schedule repetition interval), where the SRI is defined as "the consecutive beacon intervals that comprise some different awake/sleep schedules repeat at regular intervals". This implies that all PS stations will have the same idle duty cycle, where idle duty cycle is defined as the fraction of time during which the radio is on and there is no data traffic. Obviously, such a requirement (that all PS stations must have the same SRI) is impractical since we hope that each PS station can dynamically tune its idle duty cycle according to its current residual battery power or other quality-of-service (QoS for short) considerations. Worse, such a requirement requires that all WLAN NIC vendors adopt the same value of SRI. We know that a PS station with a larger SRI value can save more energy, but may suffer a longer data reception delay. Thus it is very difficult for NIC vendors to determine the best SRI value for all different kinds of environments. Worst, all known asynchronous power management protocols may completely fail when some PS stations have different values of SRI. More specifically, two PS neighbors in asynchronous environment may forever lose each other's beacon and ATIM frames when they have different SRI values.

BRIEF SUMMARY OF THE INVENTION

Asynchronous power management methods and systems for wireless networks are provided.

An embodiment of an asynchronous power management system for wireless networks, such as ad hoc wireless networks, which contains a first station and a second station. When the second station operates in the PS mode, it can set the value of SRI (measured in units of beacon interval length) at the beginning of each schedule repetition interval, where "SRI=n" means that the consecutive n beacon intervals that comprise some different awake/sleep schedules repeat at regular intervals. Once value of SRI is determined, the second station then, sets the positions of "awake beacon intervals" (ABIs for short) within the SRI, where the value of SRI must be an odd prime and the positions of ABIs within the SRI form the cyclic difference set which must contain at least two consecutive integers. The second station broadcasts a beacon frame within its every beacon window. Once the first station recently received a beacon frame from the second station, the first station can thus predict when the second station will wake up according the timestamp and awake/sleep schedule information specified in the beacon frame of the second station. At that time, the first station can send data frames to the second station based on the IEEE 802.11 procedure.

Asynchronous power management methods and systems for wireless networks may take the form of program codes embodied in a tangible media. When the program codes are loaded into and executed by a machine, that machine will become an apparatus for practicing the disclosed method.

BRIEF DESCRIPTION OF THE DRAWINGS

The invention will become more fully understood by referring to the following detailed description with reference to the accompanying drawings, wherein:

FIG. 10 is an example of an awake/sleep schedule table;

DETAILED DESCRIPTION OF THE INVENTION

Asynchronous power management methods and systems for wireless networks are provided.

Figure 1:
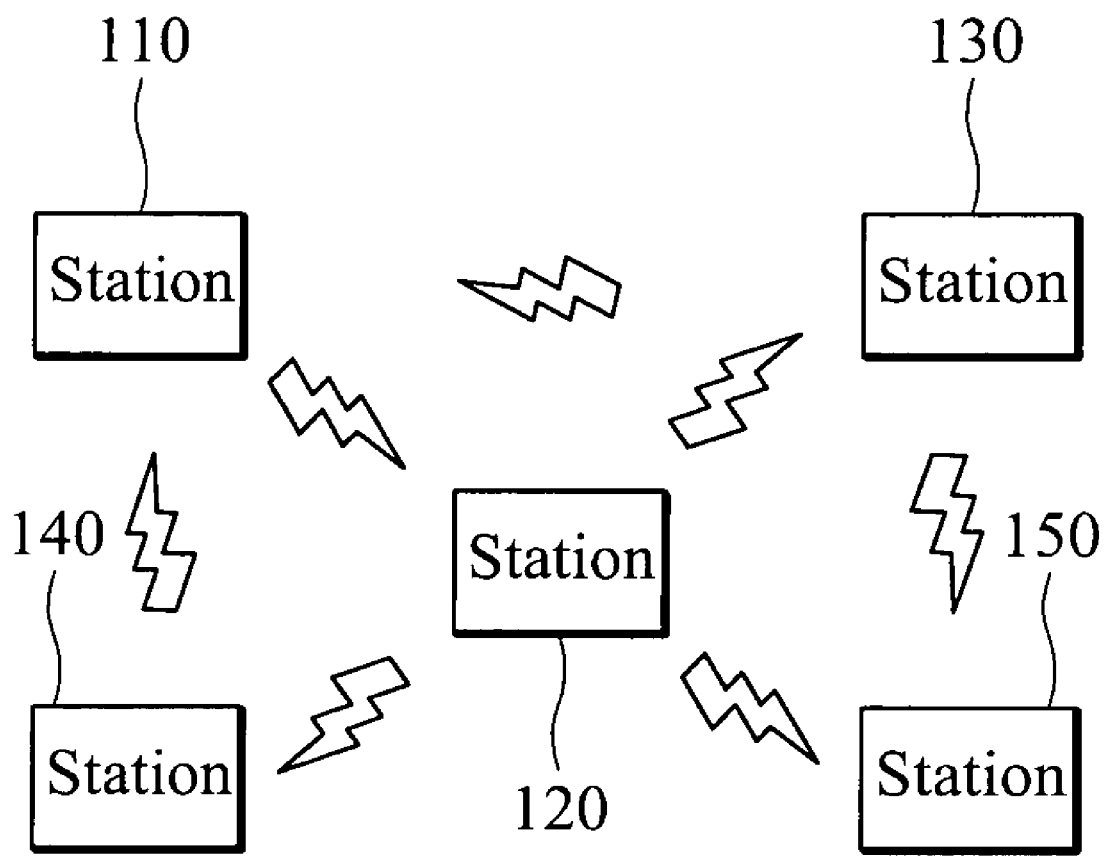
FIG. 1 is a schematic diagram illustrating an ad hoc wireless network.
Figure 2:
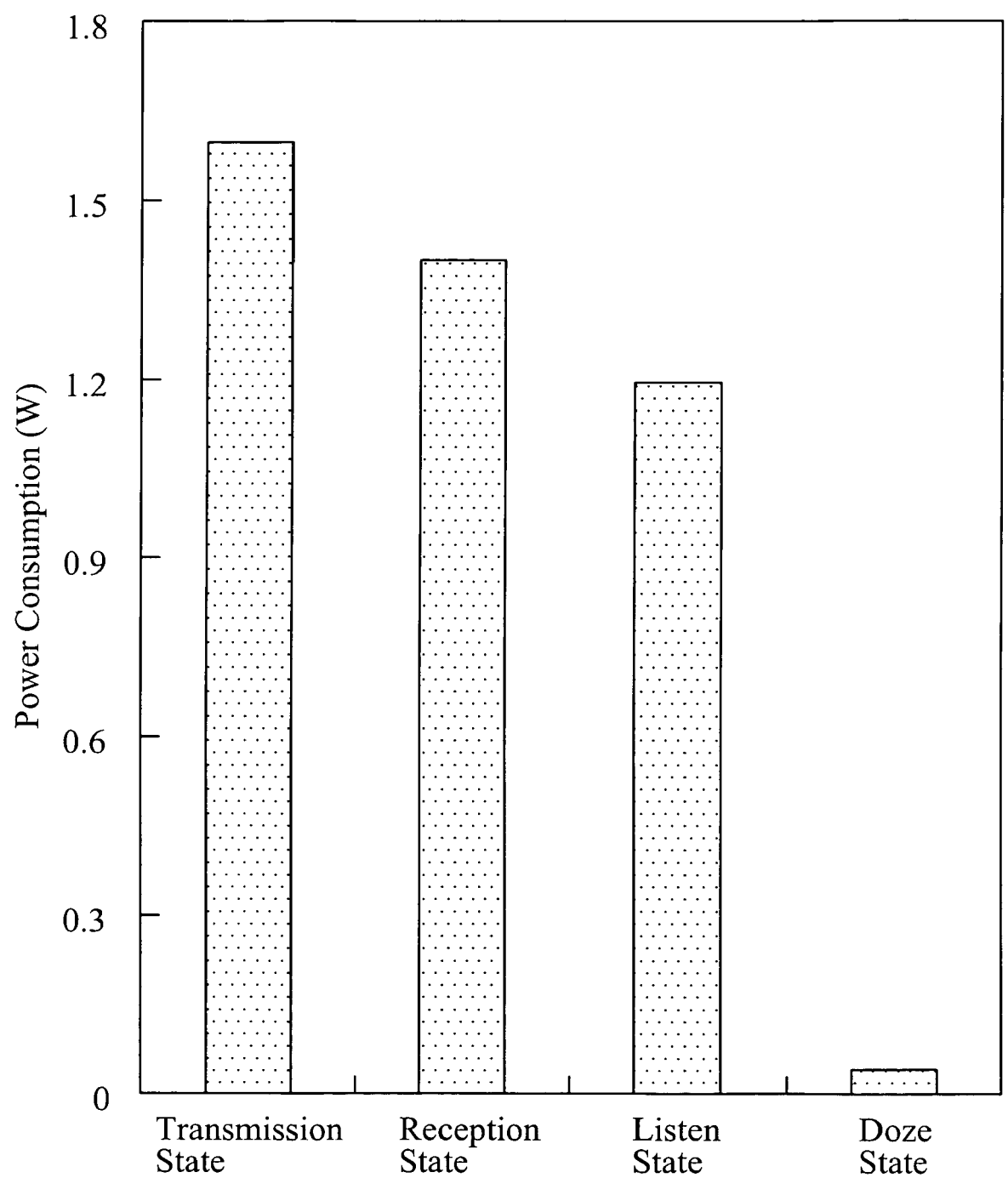
FIG. 2 is a schematic diagram illustrating a power consumption model of a general network interface card.
Figure 3:
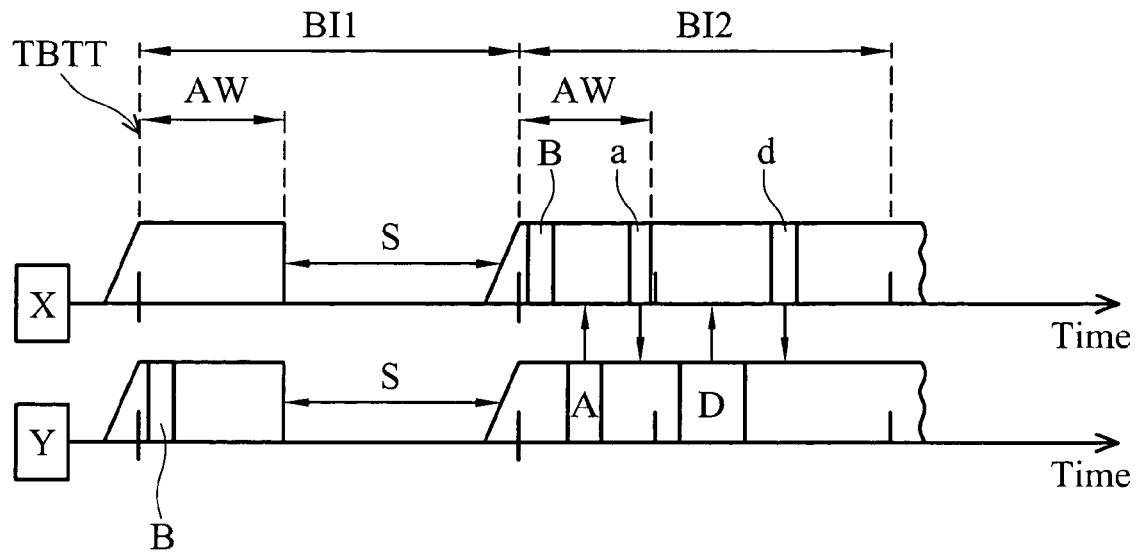
FIG. 3 is a schematic diagram illustrating an example of IEEE 802.11 power management in an ad hoc wireless network.
Figure 4:
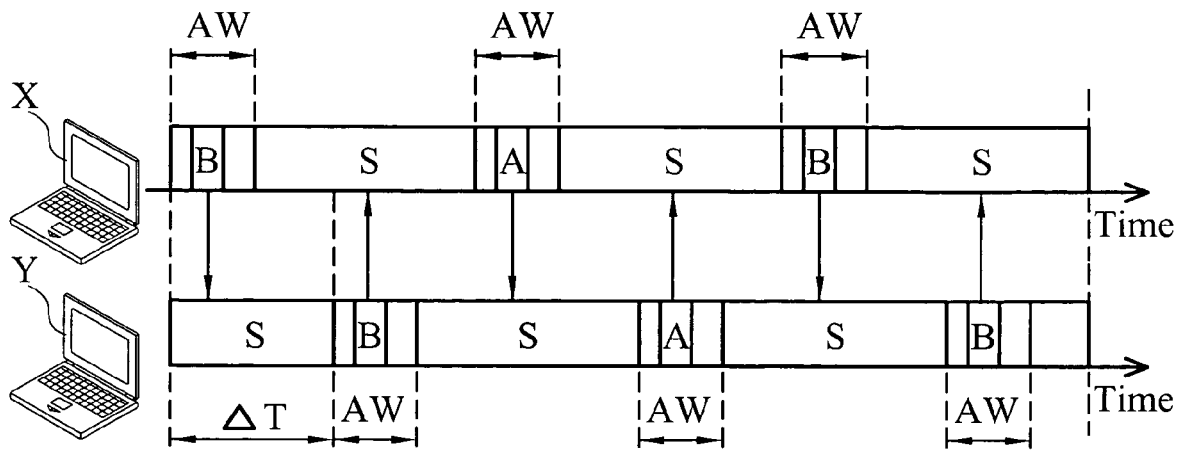
FIG. 4 is a schematic diagram illustrating an example of IEEE power management in an ad hoc wireless network, where the clock offset between stations X and Y lies in between AW and BI-AW.
Figure 5:
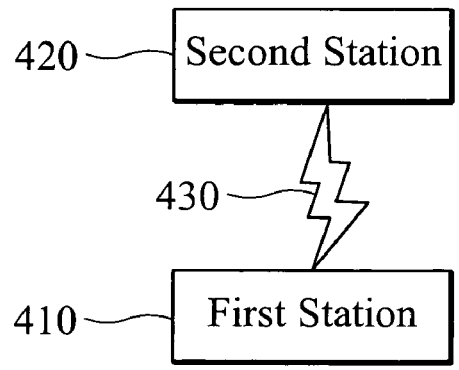
FIG. 5 is a schematic diagram illustrating an embodiment of an asynchronous power management system.

FIG. 5 is a schematic diagram illustrating an embodiment of an asynchronous power management system. As shown in FIG. 5, the asynchronous power management system 400 comprises a wireless network, such as an ad hoc wireless network, that includes at least a first station 410 and a second station 420. The first station 410 and the second station 420 can be devices with wireless communication capability, such as computers, PDAs, mobile phones, and smart phones, but are not limited thereto. The first station 410 and the second station 420 can communicate with each other via radio 430.

In the invention, a BI can be either an ABI (Awake Beacon Interval) or an SBI (Sleep Beacon Interval).

Figure 6:
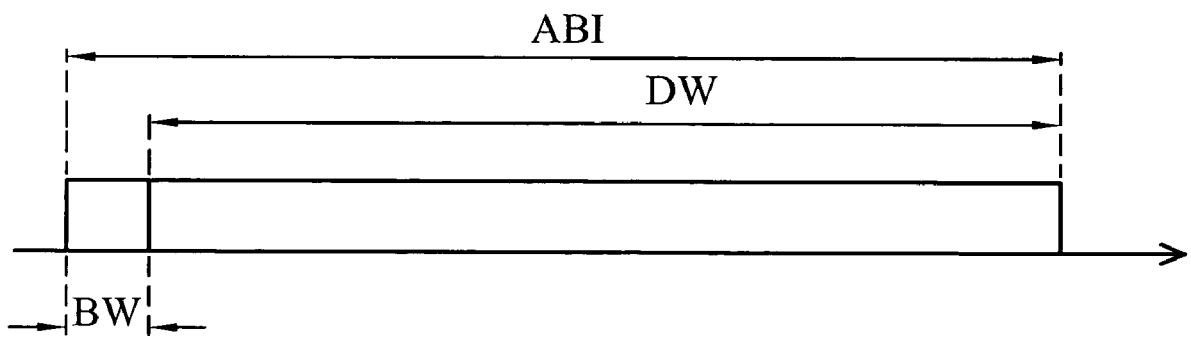
FIG. 6 is a schematic diagram illustrating an embodiment of an ABI (awake beacon interval)

FIG. 6 is a schematic diagram illustrating an embodiment of an ABI. As shown in FIG. 6, the ABI consists of a BW (Beacon Window) and a DW (Data Window). A station can transmit its beacon frame within its BW. During the DW, the PS station should be awake, and can directly receive data frames from other stations. In our invention, no matter a beacon frame is received from other stations, each PS station should transmit its own beacon frame during its own BWs.

Figure 7:
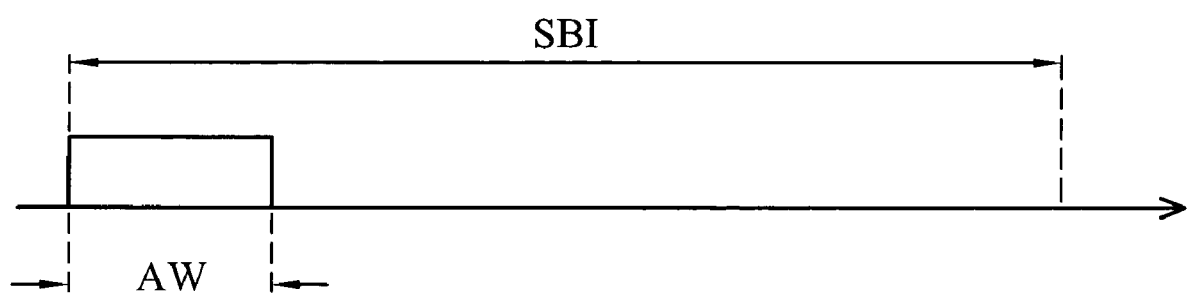
FIG. 7 is a schematic diagram illustrating an embodiment of an SBI (sleep beacon interval)

FIG. 7 is a schematic diagram illustrating an embodiment of a SBI. The SBI contains an AW (ATIM window). Notice that, in our invention, the length of BW must be shorter than that of AW. Stations can receive ATIM frames from other stations within the AW. If a PS station receives a directed ATIM frame during the AW, that PS station must reply an ATIM ACK to the station transmitting the ATIM frame. If a PS station receives ATIM frames during the AW, then that PS station should remain awake after the end of AW. If a PS station does not receive any ATIM frames, then that PS station may enter the doze state after the AW ends.

A PS station can set the value of SRI (schedule repetition interval) at the beginning of each SRI according to the residual battery power or other QoS (quality-of-service) considerations, where "SRI=n" means that the consecutive n beacon intervals that comprise some different awake/sleep schedules repeat at regular intervals. Once the value of SRI is determined, the PS station can look up the awake/sleep schedule table shown in FIG. 10 to determine the positions of ABIs (awake beacon intervals). Note that the beacon intervals within the SRI that are not ABIs are SBIs (sleep beacon intervals).

In addition to the timestamp of the current time, the beacon frame may further include the station identifier (such as MAC address), TBTT (Target Beacon Transmission Time) of the current BI, the position of the current BI within the SRI, the bitmap of the ABI set within the SRI. Note that, in the invention, we number the positions of BIs within the SRI from the 0 to (n−1). Additionally, as shown in FIG. 9, when the SRI value is 7 and the set of ABI (that is, the positions of ABIs within the SRI) is {0,1,3}, the bitmap of the ABI set is 1101000, where the bitmap comprises 7 bits, and from left to right, the 0th, 1st, and 3rd bits are 1, and others are 0.

Figure 8:
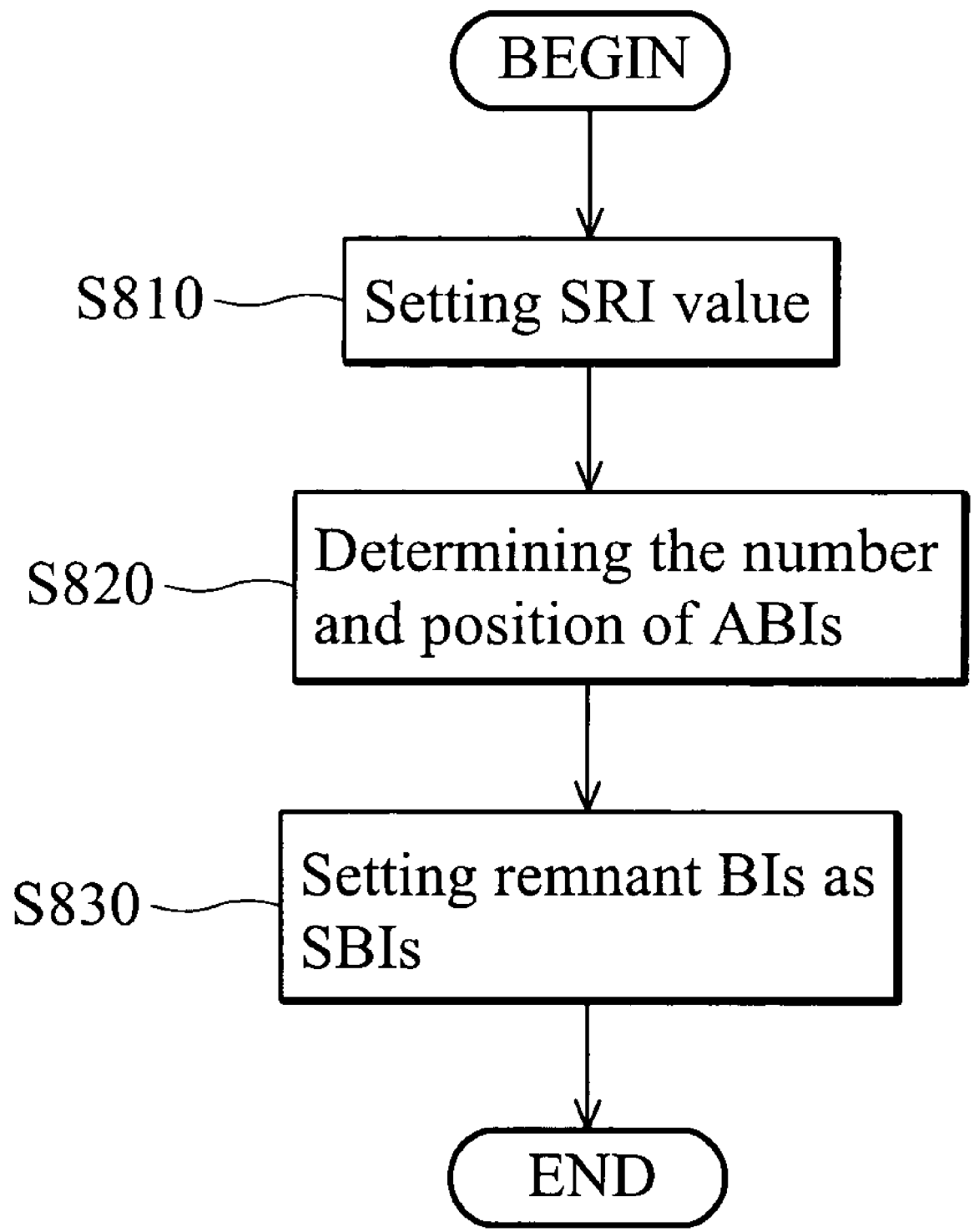
FIG. 8 is a flowchart showing an embodiment of the ABI/SBI setting procedure for a PS station.

FIG. 8 is a flowchart showing an embodiment of the ABI/SBI setting procedure for a PS station. In step S810, the PS, station should set the SRI value according its residual battery power or other QoS considerations. Once the SRI value is determined, in step S820, the PS station look up the awake/sleep schedule table to determine the positions of ABIs within the SRI. Finally, in step S830, the remaining BIs within the SRI are all SBIs.

If the SRI value is n, the number of BIs in the SRI is n, and the BIs are notated as 0th, 1st, 2nd, ... , and n−1th BIs, respectively. Each PS station adaptively determines the SRI value according to residual power state, quality-of-service requirements, or other considerations. In this embodiment, the station setting for asynchronous power management follows: (1) n is an odd prime number. (2) If the $a_1$th, $a_2$th, ..., and $a_k$th BIs are ABIs, and others are SBIs, $A=\{a_1, a_2, \ldots, a_k\}$ is a partial set of $\{0, 1, \ldots, n-1\}$, and A comprises at least two consecutive integers (BIs). (3) A is a cyclic difference set. That is the positions of the ABIs in the SRI form a cyclic difference set. For two integers p and q, $p+A=\{p+a_1 \pmod{n}, p+a_2 \pmod{n}, \ldots, p+a_k \pmod{n}\}$, and $q+A=\{q+a_1 \pmod{n}, q+a_2 \pmod{n}, \ldots, q+a_k \pmod{n}\}$. The intersection of p+A and q+A is not an empty set.

Figure 9:
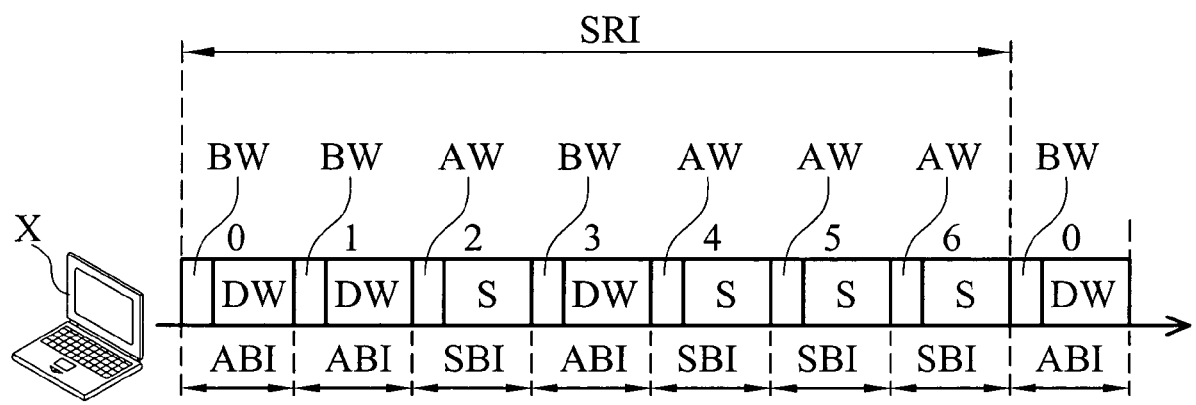
FIG. 9 is a schematic diagram illustrating an embodiment of an example of the ABI/SBI setting procedure for a PS station.

FIG. 9 is a schematic diagram illustrating an embodiment of an example of initial setting for a station, in which a beacon window is referred to as BW, a data window is referred to as DW, an ATIM window is referred to as AW, and a doze state is referred to as S. In the example of FIG. 9, n=7, representing the SRI of station X includes 7 BIs, and k=3, representing 3 ABIs selected in the SRI, where the 0th, 1st and 3rd BIs are ABIs, and others are SBIs. Therefore, 3 BWs are in the SRI, and station X can transmit and receive beacon frames within the BWs. In this example, $A=\{a_1, a_2, a_3\}=\{0, 1, 3\}$ is a cyclic difference set, and A includes two consecutive integers, 0 and 1. For integer 5, 5+A={5+0 (mod 7), 5+1 (mod 7), 5+3 (mod 7)}={5, 6, 1}. For integer −4, −4+B={−4+0 (mod 7), −4+1 (mod 7), −4+3 (mod 7)}={3, 4, 6}. The intersection of 5+B and −4+B is {6}, not an empty set.

In some embodiments, an awake/sleep schedule table can be preset in the station. The awake/sleep schedule table stores cyclic difference sets corresponding to various odd prime numbers (SRI values). FIG. 10 is an example of an awake/sleep schedule table. In this example, the awake/sleep schedule table 1000 stores the cyclic difference sets (A) corresponding to various SRIs, cyclic difference set comprising consecutive integers 0 and 1. It is understood that stations can set m+A as the positions of ABIs in the SRI, in which m is an arbitrary integer. After the SRI value is set, stations can set the number and position of the ABIs in the SRI by looking up the table.

Figure 11:
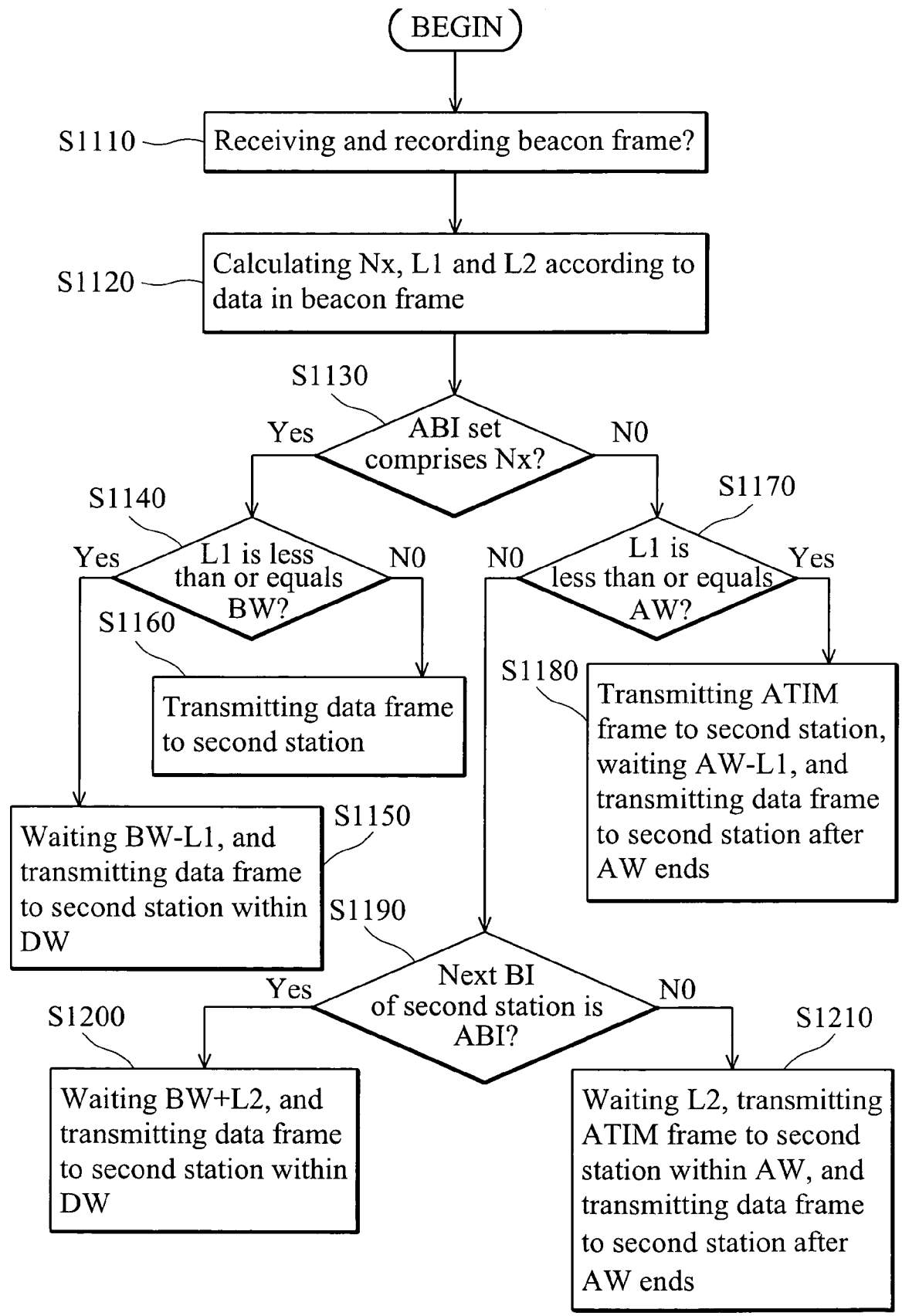
FIG. 11 is a flowchart showing an embodiment of a data transmission procedure.

FIG. 11 is a flowchart showing an embodiment of a data transmission method. It is understood that the station 420 transmits beacon frames to the first station 410, and the first station 410 transmits data frames to the second station 420. At the same time, the first station 410 can transmit beacon frames to the second station 420, the related details of which are omitted here.

In step S1110, the first station 410 receives a beacon frame from the second station 420. The beacon frame comprises a station identification, the TBTT of current BI, the BI number of current BI in SRI, a bitmap of the set of ABIs in SRI, and the SRI value. After the first station 410 receives the beacon frame from the second station 420, the data in the beacon frame is stored in a storage device (not shown) such as a cache. Once the first station 410 generates a data frame to the second station 420, in step S1120, the first station 410 calculates the current BI number in the SRI, in which the second station 420 will be, according to the data in the received beacon frame. The first station 410 further calculates a first time length L1 and a second time length L2. If the second station 420 is currently within the $N_X$ BI, the first time length L1 is a period from the beginning of the $N_X$ BI to a position where the second station 420 is currently located in the $N_X$ BI, and the second time length L2 is a period from the position where the second station 420 is currently located in the $N_X$ BI to the end of the $N_X$ BI, where L1 and L2 are equal or less than the length of BI.

Figure 15:
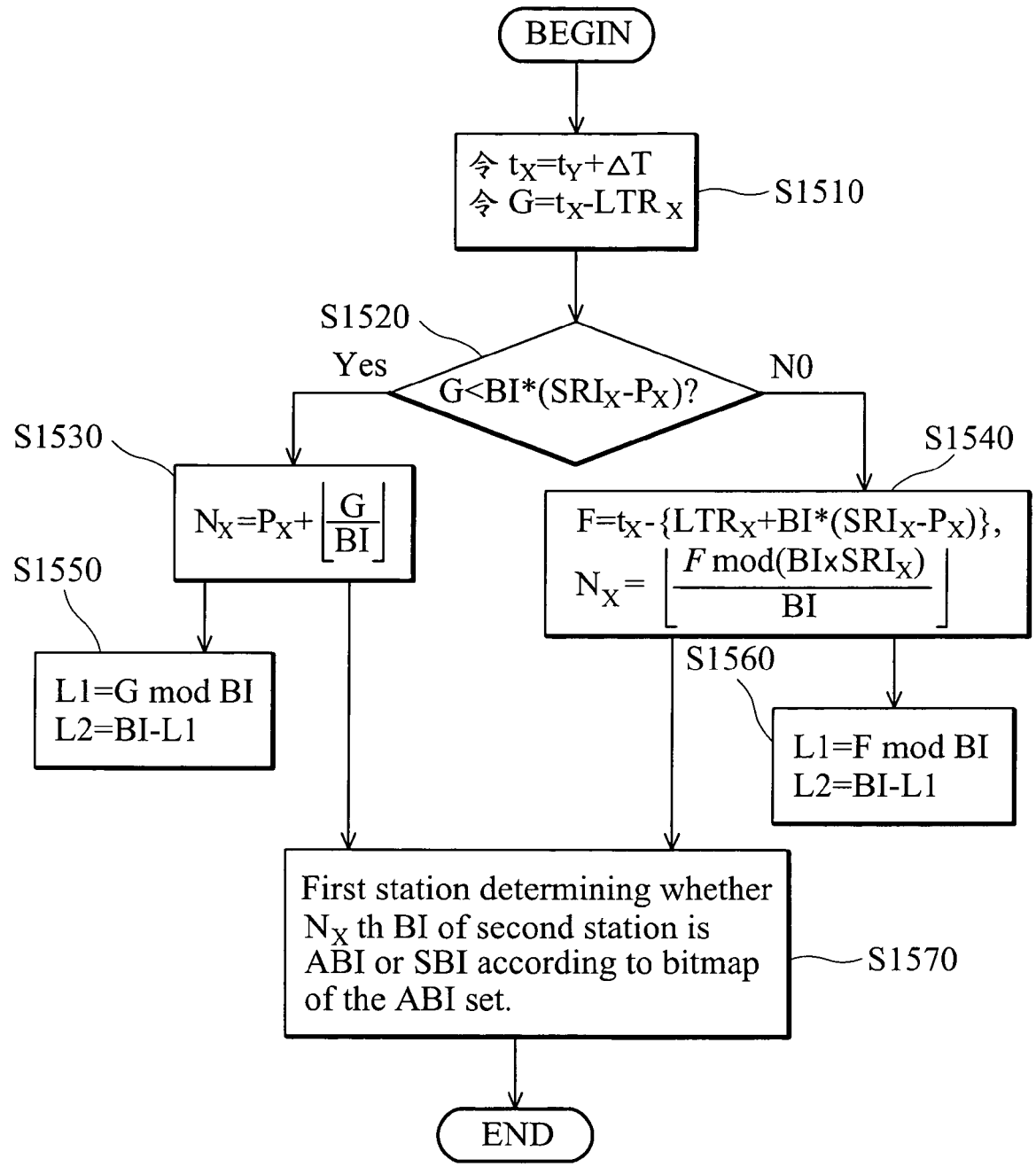
FIG. 15 is a flowchart showing an embodiment of a method for determining whether the current BI of the destination station is ABI or SBI.

The current time of the second station 420 is $t_X$, and the current time of the first station 410 is $t_Y$. It is understood that $t_X$ and $t_Y$ may be different since the network may be asynchronous (the time cannot be synchronized). It is assumed $t_Y$ is less than $t_X$, that is the timer of the first station 410 is slower than that of the second station 420. $SRI_X$ is the current SRI of the second station 420. $LTR_X$ stored in the cache of the first station 410 is the TBTT in the beacon frame recently received from the second station 420. $LBT_X$ stored in the cache of the first station 410 is the timestamp in the beacon frame recently received from the second station 420. Once the first station 410 receives the beacon frame from the second station, the clock offset $\Delta T$ between the first and second stations is calculated according to the timestamp in the beacon frame. The calculation for the $N_X$ BI where the second station 420 currently located in the $SRI_X$ is shown in FIG. 15.

Figure 12:
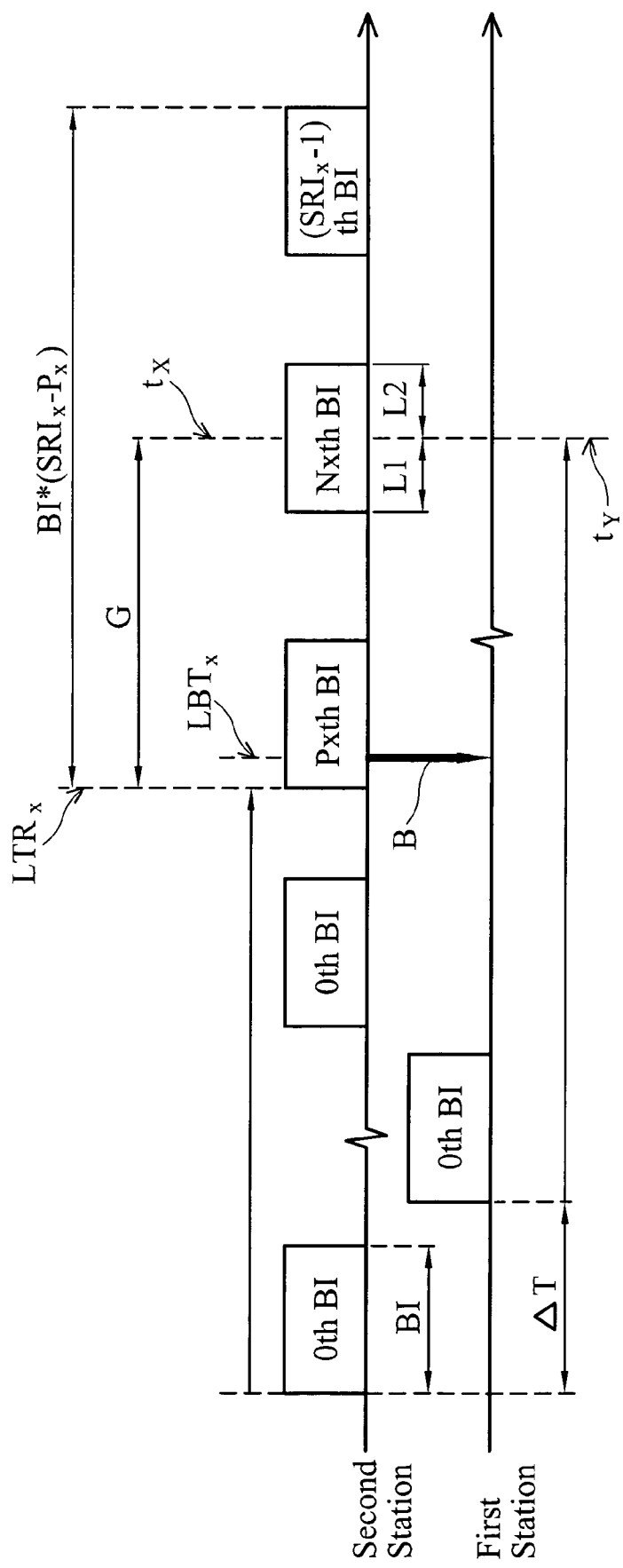
FIG. 12 is a schematic diagram illustrating an embodiment of a method for determining the position of the current BI within the SRI of the second station.
Figure 13:
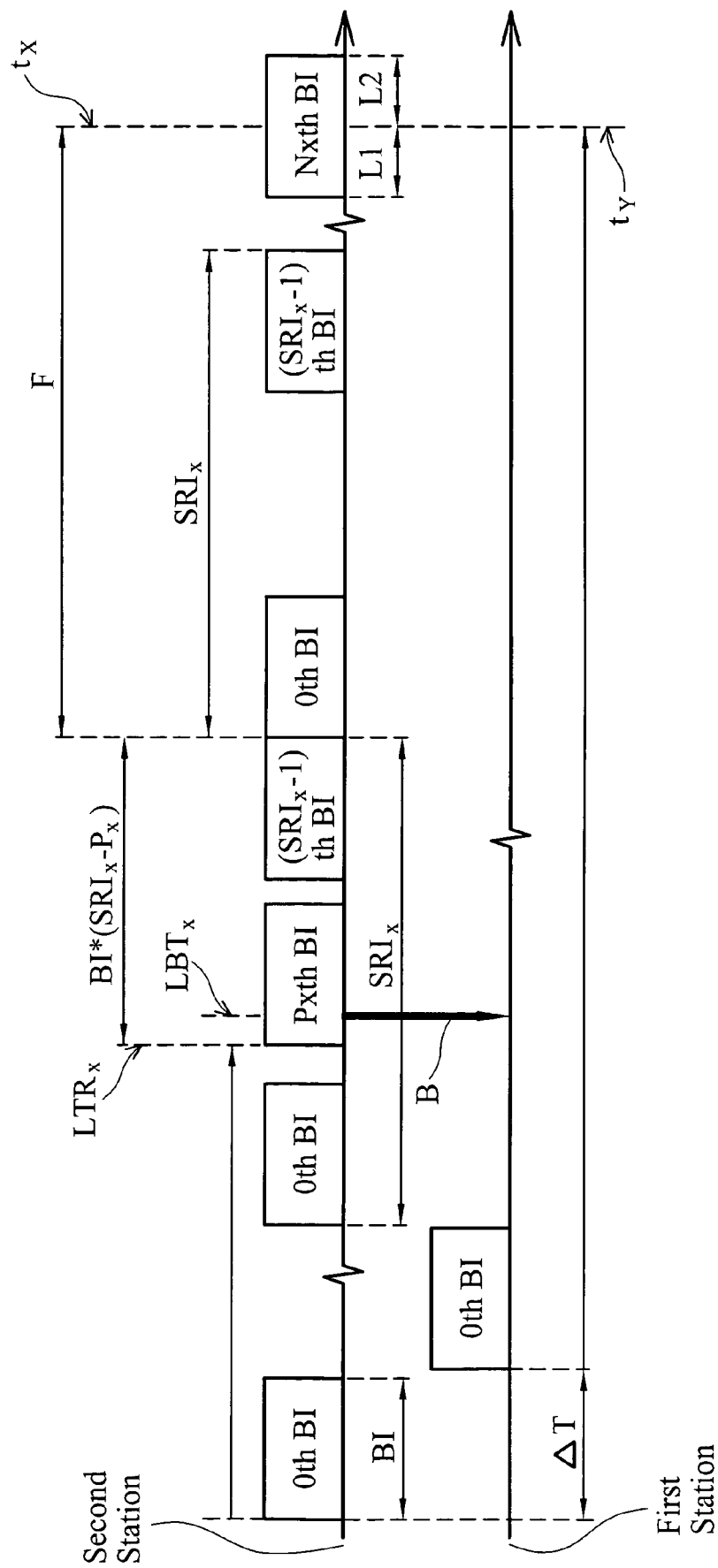
FIG. 13 is a schematic diagram illustrating another embodiment of a method for determining the position of the current BI within the SRI of the second station.

First, in step S1510, the first station 410 calculates the current time of the second station 420, where $t_X=t_Y+\alpha T$, and a variable G is set as $t_X-LTR_X$ ($G=t_X-LTR_X$). In step S1520, it is determined whether G is less than $(SRI_X-P_X)*BI$ (referring to FIG. 12). If so, in step S1530, $$N_X = P_X + \left\lfloor \frac{G}{BI} \right\rfloor,$$

and in step S1550, the L1 value and L2 value are calculated, where L1=G mod BI, and L2=BI−L1. If not, in step S1540, a variable F is as $t_X-\{LTR_X+BI*(SRI_X-P_X)\}$ ($F=t_X-\{LTR_X+BI*(SRI_X-P_X)\}$) (referring to FIG. 13), and $$N_X = \left\lfloor \frac{F \bmod (BI \times SRI_X)}{BI} \right\rfloor,$$

and in step S1560, the L1 value and L2 value are calculated, where L1=F mod BI, and L2=BI−L1. After $N_X$ is calculated, in steps S1130 and S1570, the first station 410 determines whether the $N_X$ BI of the second station 420 is an ABI or a SBI according to the bitmap of the ABI set. For example, if $N_X$ is 3, and the bitmap is 1101000 (from left to right, the third bit is 1), the second station 420 is within an ABI.

If the first station 410 generates a data frame to the second station 420, the first station 410 transmits the data frame to the second station 420 according to the operations in FIG. 11. Specifically, if the first station 410 generates a data frame to the second station 420 at $t_Y$, and the second station 420 is currently within the $N_X$ BI in the SRI, in step S1130, the first station 410 determines whether the $N_X$ BI is an ABI. If so (Yes in step S1130), in step S1140, it is determined whether L1 is less than or equals the length of the BW. If so (Yes in step S1140), in step S1150, the first station 410 waits a period of BW−L1, and transmits the data frame to the second station 420 within the DW of the second station 420. If not (No in step S1140), in step S1160, the first station 410 directly transmits the data frame to the second station 420.

If the $N_X$ BI is not an ABI (No in step S1130), in step S1170, it is determined whether L1 is less than or equals the length of AW. If so (Yes in step S1170), in step S1180, the first station 410 transmits an ATIM frame to the second station 420, waits a period of AW−L1, and transmits the data frame to the second station 420. It is understood that after receiving the ATIM frame, the second station 420 returns an ATIM ACK to the first station 410. If not (No in step S1170), in step S1190, the first station 410 determines whether the next BI of the second station 420 is an ABI. If so (Yes in step S1190), in step S1200, the first station 410 waits a period of BW+L2, and transmits the data frame to the second station 420 within the DW of the second station 420. If not (No in step S1190), in step S1210, the first station 410 waits a period of L2, and transmits an ATIM frame to the second station 420 within an AW of the second station 420. After the AW of the second station 420 ends, the first station 410 transmits the data frame to the second station 420.

Figure 14:
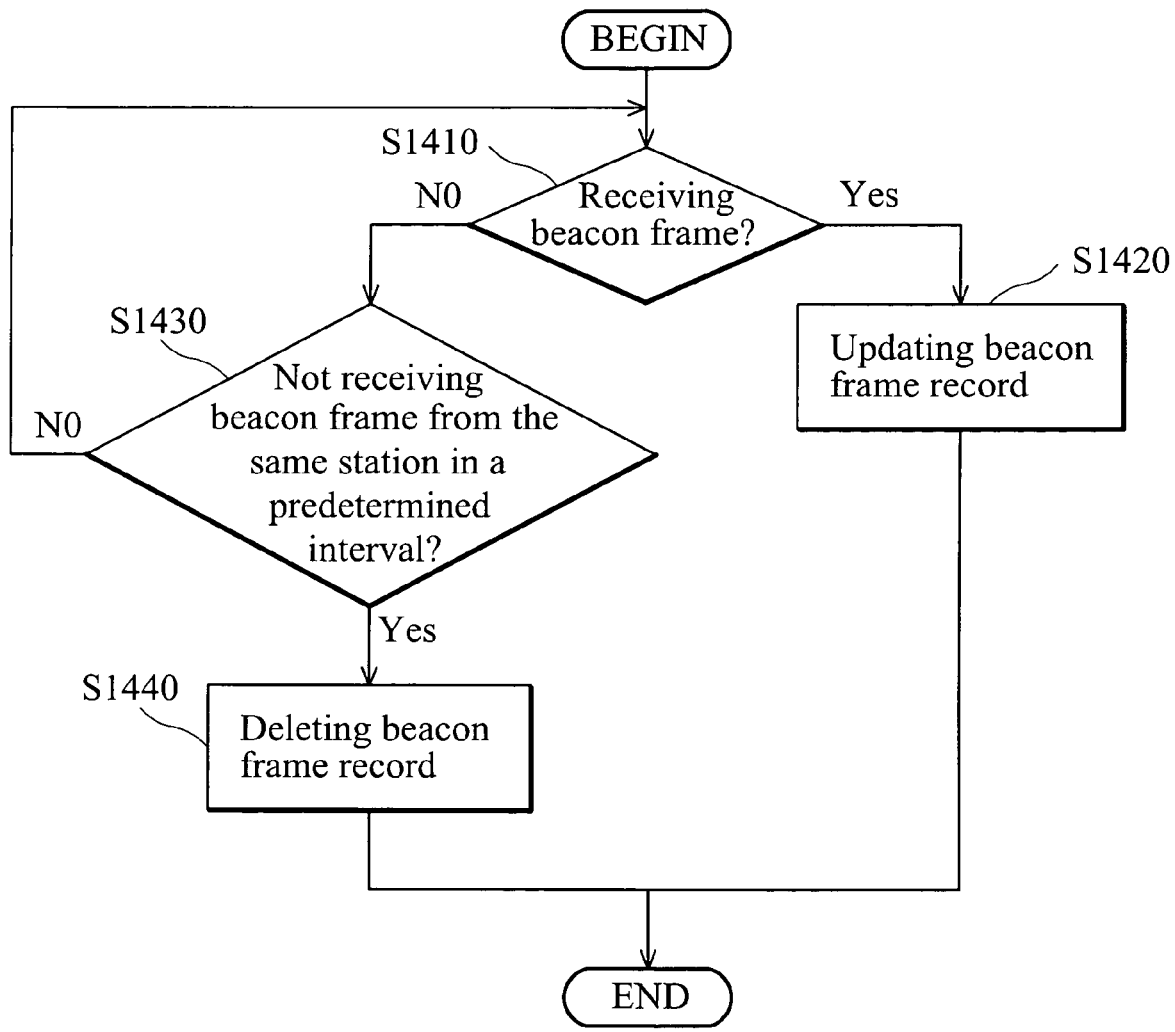
FIG. 14 is a flowchart showing an embodiment of a method for neighbor table maintenance.

FIG. 14 is a flowchart showing an embodiment of a method for beacon frame maintenance. In step S1410, it is determined whether a beacon frame is received from a station. If so, in step S1420, the data in the beacon frame corresponding to the station is updated. If not, in step S1430, it is determined whether beacon frames transmitted from the same station have been received in a predetermined interval. If the time difference between two beacon frames does not exceed the predetermined interval, the procedure returns to step S1410. If no new beacon frame corresponding to the same station is received, in step S1440, the data corresponding to the station is deleted.

Asynchronous power management methods and systems for wireless networks, or certain aspects or portions thereof, may take the form of program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. An asynchronous power management method for use in a first station and a second station in a wireless ad hoc network, comprising:
    determining an SRI (Schedule Repetition Interval) value, in which the SRI defines an awake/sleep schedule, the unit of the SRI value is a BI (Beacon Interval), the SRI value is an odd prime number, and the second station repeats the awake/sleep schedule at regular intervals based on the value of the SRI;
    determining a number of ABIs (Awake Beacon Intervals) and positions thereof within the SRI, in which the positions of the ABIs in the SRI form a cyclic difference set comprising at least two consecutive ABIs;
    within every BW (Beacon Window),
    the second station transmitting a beacon frame, wherein the beacon frame comprises the BI number of the current BI in an SRI, and a bitmap of the set of ABIs in the SRI;
    the first station receiving the beacon frame from the second station, determining whether the second station is currently in an ABI according to the beacon frame; and
    if so, transmitting data frames to the second station during the ABI of the second station.

2. The method of claim 1 further comprising the second station resetting the SRI value according to the residual power state or other QoS (quality of service) considerations, such as delay requirements, after the SRI ends.

3. The method of claim 1 further comprising the first station deleting a record of the second station in its cached neighbor table if no other beacon frame is received from the second station in a predetermined interval.

4. The method of claim 1 wherein the ABI comprises a BW and a DW (Data Window), the second station transmit its beacon frame within the BW, and receives data frames from the first station within the DW.

5. The method of claim 1 further comprising the second station determining the number and positions of SBIs (Sleep Beacon Intervals) within the SRI, in which the SBI comprises an AW (ATIM Window).

6. The method of claim 5 further comprising:
    the first station determining whether the second station is currently within the AW of the SBI according to the received beacon frame corresponding to the second station;
    if so, the first station transmitting an ATIM frame to the second station within the AW of the SBI of the second station;
    the second station transmitting an ATIM ACK to the first station in response to the ATIM frame;
    the first station transmitting the data frame to the second station within the SBI after the AW ends; and
    the second station transmitting a data ACK to the first station after receiving the data frame.

7. The method of claim 5 further comprising:
    the first station determining whether the second station is currently in a doze state according to the received beacon frame corresponding to the second station;
    if so, the first station determining whether the next BI of the second station is the ABI or the SBI; and
    if the next BI is the ABI, the first station transmitting data frames to the second station within the next BI.

8. The method of claim 7 further comprising:
    if the next BI is the SBI, the first station transmitting an ATIM frame to the second station within the AW of the next BI of the second station;
    the second station transmitting an ATIM ACK to the first station in response to the ATIM frame;
    the first station transmitting the data frame to the second station within the SBI after the AW ends; and
    the second station transmitting a data ACK to the first station after receiving the data frame.

9. The method of claim 1 wherein the beacon frame further comprises a station identification, a timestamp of current time, TBTT (Target Beacon Transmission Time) of the current BI, and the SRI value.

10. An asynchronous power management system for wireless ad hoc networks, comprising:
    a second station comprising means for determining an SRI (Schedule Repetition Interval) value, in which the SRI defines an awake/sleep schedule, the unit of the SRI value is a BI (Beacon Interval), the SRI value is an odd prime number, and the second station repeats the awake/sleep schedule at regular intervals based on the value of the SRI means for, determining a number of ABIs (Awake Beacon Intervals) and positions thereof within the SRI, in which the positions of the ABIs in the SRI form a cyclic difference set comprising at least two consecutive ABIs, and within every BW (Beacon Window) and means for, transmitting a beacon frame, wherein the beacon frame comprises the BI number of the current BI in an SRI, and a bitmap of the set of ABIs in the SRI; and
    a first station means for receiving the beacon frame from the second station means for, determining whether the second station is currently in an ABI according to the beacon frame, and if so and means for, transmitting data frames to the second station during the ABI of the second station.

11. The system of claim 10 wherein the second station further resets the SRI value according to residual power state or other QoS (quality of service) considerations, such as delay requirements, after the SRI ends.

12. The system of claim 10 wherein the first station further deletes a record of the second station in its cached neighbor table if no other beacon frame is received from the second station in a predetermined interval.

13. The system of claim 10 wherein the ABI comprises a BW and a DW (Data Window), with the second station transmitting its beacon frame within the BW, and receiving data frames from the first station within the DW.

14. The system of claim 10 wherein the second station further determines the number and positions of SBIs (Sleep Beacon Intervals) within the SRI, in which the SBI comprises an AW (ATIM Window).

15. The system of claim 14 wherein the first station further determines whether the second station is currently within the AW of the SBI according to the received beacon frame corresponding to the second station, if so, the first station transmits an ATIM frame to the second station within the AW of the SBI of the second station, the second station transmits an ATIM ACK to the first station in response to the ATIM frame, the first station transmits the data frame to the second station within the SBI after the AW ends, and the second station transmits a data ACK to the first station after receiving the data frame.

16. The system of claim 14 wherein the first station further determines whether the second station is currently in a doze state according to the received beacon frame corresponding to the second station, and if so, the first station determines whether the next BI of the second station is the ABI or the SBI, and if the next BI is the ABI, the first station transmits a data frame to the second station within the next BI.

17. The system of claim 16 wherein the first station further transmits an ATIM frame to the second station within the AW of the next BI of the second station if the next BI is the SBI, the second station transmits an ATIM ACK to the first station in response to the ATIM frame, the first station transmits the data frame to the second station within the SBI after the AW ends, and the second station transmits a data ACK to the first station after receiving the data frame.

18. The system of claim 10 wherein the data of the beacon frame further comprises a station identification, a timestamp of current time, TBTT (Target Beacon Transmission Time) of the current BI, and the SRI value.

19. An asynchronous power management method for use in a second station in a wireless ad hoc network, comprising:

determining an SRI (Schedule Repetition Interval) value, in which the SRI defines an awake/sleep schedule, the unit of the SRI value is a BI (Beacon Interval), the SRI value is an odd prime number, and the second station repeats the awake/sleep schedule at regular intervals based on the value of the SRI;

determining a number of ABIs (Awake Beacon Intervals) and positions thereof within the SRI, in which the positions of the ABIs in the SRI form a cyclic difference set comprising at least two consecutive ABIs;

within every BW (Beacon Window), transmitting a beacon frame, wherein the beacon frame comprises the BI number of the current BI in an SRI, and a bitmap of the set of ABIs in the SRI; and receiving data frames from a first station during the ABI.

20. The method of claim 19 further comprising resetting the SRI value according to residual power state or other QoS (quality of service) considerations, such as delay requirements, after the SRI ends.

21. The method of claim 19 wherein the ABI comprises a BW and a DW (Data Window), the second station transmit its beacon frame within the BW, and receives data frames from the first station within the DW.

22. The method of claim 19 further comprising determining the number and positions of SBIs (Sleep Beacon Intervals) within the SRI, in which the SBI comprises an AW (ATIM Window).

23. The method of claim 22 further comprising:

receiving an ATIM frame from the first station within the AW of the SBI of the second station;

transmitting an ATIM ACK to the first station in response to the ATIM frame;

receiving the data frame from the first station within the SBI after the AW ends; and transmitting a data ACK to the first station after receiving the data frame.

24. The method of claim 19 wherein the data of the beacon frame further comprises a station identification, a timestamp of current time, TBTT (Target Beacon Transmission Time) of the current BI and the SRI value.

* * * * *